US012786372B1

(12) United States Patent
Petrell et al.

(10) Patent No.: US 12,786,372 B1
(45) Date of Patent: Nov. 3, 2026

(54) GRAPHICAL ELEMENT HINTING FOR THREE-DIMENSIONAL DISPLAYS

(71) Applicant: Distance Technologies Oy, Helsinki (FI)

(72) Inventors: Joona Petrell, Tampere (FI); Mikko Strandborg, Hangonkylä (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/353,778

(22) Filed: Oct. 9, 2025

Related U.S. Application Data

(63) Continuation-in-part of application No. 19/299,908, filed on Aug. 14, 2025, now Pat. No. 12,469,209.

(51) Int. Cl.

| | |
|---|---|
| ***H04N 13/383*** | (2018.01) |
| ***G06T 15/20*** | (2011.01) |
| ***G06T 15/55*** | (2011.01) |
| ***H04N 13/178*** | (2018.01) |
| ***H04N 13/271*** | (2018.01) |
| ***H04N 13/327*** | (2018.01) |
| ***H04N 23/55*** | (2023.01) |
| *H04N 13/00* | (2018.01) |

(52) U.S. Cl.
CPC ......... *H04N 13/383* (2018.05); *G06T 15/205* (2013.01); *G06T 15/55* (2013.01); *H04N 13/178* (2018.05); *H04N 13/271* (2018.05); *H04N 13/327* (2018.05); *H04N 2013/0085* (2013.01)

(58) Field of Classification Search
CPC .. H04N 13/383; H04N 13/327; H04N 13/178; H04N 13/271; H04N 2013/0085; G06T 15/205; G06T 15/55
USPC .......................................................... 348/51
See application file for complete search history.

(56) References Cited

U.S. PATENT DOCUMENTS

| | | | | |
|---|---|---|---|---|
| 9,648,308 | B2 * | 5/2017 | Hinnen | H04N 13/354 |
| 9,699,433 | B2 * | 7/2017 | Zhou | G06F 3/013 |
| 12,360,595 | B1 * | 7/2025 | Petrell | G02B 27/0101 |
| 2020/0175750 | A1 * | 6/2020 | Lee | H04N 13/366 |
| 2024/0096035 | A1 * | 3/2024 | Rasmussen | G06T 7/20 |
| 2025/0123490 | A1 * | 4/2025 | Webel | G02B 27/0172 |

FOREIGN PATENT DOCUMENTS

| | | | | |
|---|---|---|---|---|
| WO | WO-2026023839 A1 * | 1/2026 | | G06T 13/20 |

* cited by examiner

*Primary Examiner* — Albert Kir
(74) *Attorney, Agent, or Firm* — Ziegler IP Law Group, LLC.

(57) ABSTRACT

In a three-dimensional (3D) display, an optical element is arranged on an optical path of an array of light-emitting elements. A region of the array to be employed to display a graphical element to a given eye is determined, based on a position of the graphical element within a 3D view frustum. A sample map indicating perceived shapes, perceived sizes and relative perceived positions of light-emitting elements in at least said region is generated from a perspective of the given eye, based on a relative location of the given eye with respect to an image plane and on optical distortion parameters of the optical element. A shape of the graphical element is adjusted while selecting a set of light-emitting elements from said region for displaying the graphical element, based on the sample map. This set is employed for displaying the graphical element to the given eye.

20 Claims, 4 Drawing Sheets

| | | | | | | | | | |
|---|---|---|---|---|---|---|---|---|---|
| 0 | 1 | 2 | 3 | 4 | 5 | 6 | 7 | 8 | 9 |
| 1 | 2 | 3 | 4 | 5 | 6 | 7 | 8 | 9 | 0 |
| 2 | 3 | 4 | 5 | 6 | 7 | 8 | 9 | 0 | 1 |
| 3 | 4 | 5 | 6 | 7 | 8 | 9 | 0 | 1 | 2 |
| 4 | 5 | 6 | 7 | 8 | 9 | 0 | 1 | 2 | 3 |
| 5 | 6 | 7 | 8 | 9 | 0 | 1 | 2 | 3 | 4 |
| 6 | 7 | 8 | 9 | 0 | 1 | 2 | 3 | 4 | 5 |
| 7 | 8 | 9 | 0 | 1 | 2 | 3 | 4 | 5 | 6 |
| 8 | 9 | 0 | 1 | 2 | 3 | 4 | 5 | 6 | 7 |
| 9 | 0 | 1 | 2 | 3 | 4 | 5 | 6 | 7 | 8 |

FIG. 1C

GRAPHICAL ELEMENT HINTING FOR THREE-DIMENSIONAL DISPLAYS

CROSS-REFERENCE TO RELATED APPLICATIONS

This application is a continuation-in-part of U.S. patent application Ser. No. 19/299,908, titled "PIXEL-ACCURATE GRAPHICS RASTERIZATION FOR 3D DISPLAYS" filed on Aug. 14, 2025, which is incorporated herein by reference.

TECHNICAL FIELD

The present disclosure relates to systems for graphical element hinting in three-dimensional (3D) displays. The present disclosure also relates to methods for graphical element hinting in 3D displays.

BACKGROUND

Three-dimensional (3D) displays present graphical elements by directing light from individual light-emitting elements toward each eye of a user.

This arrangement enables 3D perception but complicates the accurate rendering of two-dimensional (2D) content such as text, user interface (UI) elements, and vector graphics.

In conventional 2D displays, font hinting techniques have been used to adjust character outlines so that they align more effectively with a regular grid of light-emitting elements. Such hinting improves clarity and legibility, particularly at small font sizes. On modern high-resolution flat-panel displays, the importance of hinting has diminished as increasing pixel densities allow more faithful reproduction of typefaces.

In contrast, in 3D displays, several factors contribute to degradation of font and vector rendering quality:

1. Because separate images are generated for each eye, the effective resolution available per eye is reduced.
2. Wide viewing angles can lower the effective display density, making individual light-emitting elements perceptible and reducing the overall smoothness of rendered text and vector graphics.
3. Optical elements such as lenticular arrays and parallax barriers alter the perceived positions, sizes, and shapes of the underlying light-emitting elements, creating a non-linear and view-dependent layout.
4. Some light-emitting elements are occluded or contribute little perceptual value due to barriers or lens edges, resulting in dead zones and spatial discontinuities. Additionally, certain light-emitting elements may need to be dimmed to suppress crosstalk between different views, further reducing the effective resolution.
5. Additional optical components, such as curved optical combiners used in augmented-reality (AR) systems, further introduce geometric distortion, magnification, and asymmetry in how graphical elements are perceived.
6. Variations in apparent resolution and irregular sampling can cause key glyph features such as stems, serifs, or diacritical marks to appear blurred, uneven, or missing altogether.

These issues are intensified under dynamic viewing conditions. As a user's head moves, the viewing geometry changes, and with it the effective layout of light-emitting elements. Text and other vector graphics may therefore appear unstable or inconsistent across frames, undermining readability.

Conventional rasterization and font hinting techniques, developed for uniform 2D grids of light-emitting elements, do not address these challenges. As a result, ensuring consistent legibility, correct alignment, and aesthetic quality of graphical elements in 3D displays remains a significant problem.

SUMMARY

The present disclosure seeks to provide a system and method for graphical element hinting in a three-dimensional (3D) display, thereby improving legibility, alignment, and spatial consistency of graphical elements under view-dependent optical distortions. The aim of the present disclosure is achieved by a system and a method in which graphical elements are adjusted and aligned to perceived shapes, perceived sizes, and relative perceived positions of light-emitting elements that emit light toward a given eye, based on a relative location of the given eye with respect to an image plane and optical distortion parameters of at least one optical element, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1C is a schematic illustration of a region of an array of light-emitting elements in the 3D display, while

DETAILED DESCRIPTION OF EMBODIMENTS

Figure 1A:
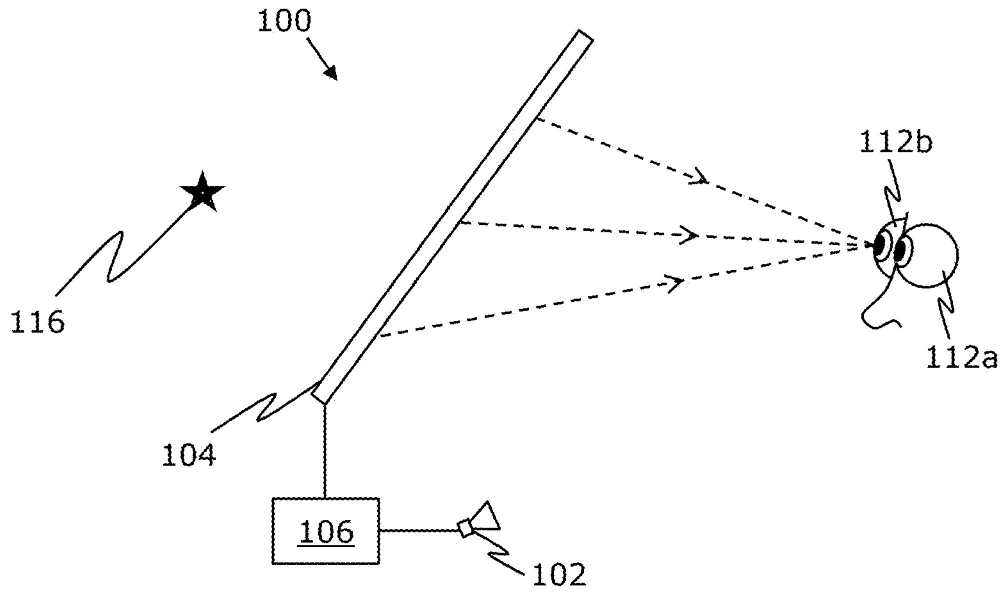
FIGS. 1A and 1B are schematic illustrations of a system for graphical element hinting in a 3D display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

a tracker;

a three-dimensional (3D) display comprising:

an array of light-emitting elements; and at least one optical element arranged on an optical path of the array of light-emitting elements; and at least one processor configured to:

determine a relative location of each eye of at least one user with respect to an image plane of the 3D display, using the tracker;

determine a 3D view frustum corresponding to a given eye of an individual one of the at least one user, based on a relative location of the given eye with respect to the image plane;

determine a region of the array of light-emitting elements to be employed to display a graphical element to the given eye, based on a position of the graphical element within the 3D view frustum;

generate a sample map indicating perceived shapes, perceived sizes and relative perceived positions of light-emitting elements in at least the region of the array, from a perspective of the given eye, based on the relative location of the given eye with respect to the image plane and on optical distortion parameters of the at least one optical element;

adjust a shape of the graphical element, while selecting a set of light-emitting elements from the region of the array for displaying the graphical element to the given eye, based on the sample map; and employ the set of light-emitting elements to emit light for displaying the graphical element to the given eye.

In a second aspect, an embodiment of the present disclosure provides a method comprising:

determining a relative location of each eye of at least one user with respect to an image plane of a three-dimensional (3D) display, using a tracker, wherein the 3D display comprises an array of light-emitting elements and at least one optical element arranged on an optical path of the array of light-emitting elements;

determining a 3D view frustum corresponding to a given eye of an individual one of the at least one user, based on a relative location of the given eye with respect to the image plane;

determining a region of the array of light-emitting elements to be employed to display a graphical element to the given eye, based on a position of the graphical element within the 3D view frustum;

generating a sample map indicating perceived shapes, perceived sizes and relative perceived positions of light-emitting elements in at least the region of the array, from a perspective of the given eye, based on the relative location of the given eye with respect to the image plane and on optical distortion parameters of the at least one optical element;

adjusting a shape of the graphical element, while selecting a set of light-emitting elements from the region of the array for displaying the graphical element to the given eye, based on the sample map; and employing the set of light-emitting elements to emit light for displaying the graphical element to the given eye.

The present disclosure provides the aforementioned system and method for graphical element hinting that adjust a shape of a graphical element based on a sample map of light-emitting elements in a 3D display. By generating the sample map indicating perceived shapes, perceived sizes, and relative perceived positions of the light-emitting elements that emit light toward a given eye of a user, the system and method enable view-dependent modelling of the effective layout of the light-emitting elements as perceived by the given eye. This enables direct adjustment of the shape of the graphical element so that its outline, features, and spatial placement align with the non-uniform, view-dependent layout of the array of light-emitting elements.

By employing this view-dependent sample map, the system and method overcome limitations of conventional rasterization and font hinting pipelines that assume a uniform two-dimensional (2D) grid of light-emitting elements. In particular, the system and method address reduced effective resolution per eye by ensuring that even small graphical features of the graphical element are mapped accurately to light-emitting elements that are employed to present the graphical element. The system and method mitigate effects of non-linear layouts introduced by optical elements such as lenticular arrays or parallax barriers by adjusting shapes of graphical elements to the distorted layout of the array perceived by the given eye. Additionally, by modelling optical distortion parameters of curved or asymmetric optical elements, the system and method preserve the alignment and legibility of graphical elements under magnification or warping introduced along the optical path.

Because the adjustment is performed directly against a sample map that reflects the current relative location of the given eye and optical distortion as perceived from that location, the system and method provide consistent reproduction of graphical elements even as the user's head moves and the perceived layout of light-emitting elements changes dynamically. This enables stability of appearance across frames, maintaining legibility and alignment in motion where conventional techniques would produce temporal inconsistencies.

Typography is central to user interface design, and pixel-level (and subpixel level) hinting enabled by the present disclosure allows legible rendering at point sizes that would otherwise require higher-density displays. By achieving clarity through software-driven adjustment rather than hardware scaling, the system and method reduce reliance on costly high-DPI panels, thereby lowering the overall bill of materials (BOM) for 3D displays.

The system and method operate entirely through 3D rendering based on sample maps that reflect both the relative location of the user's eyes and the optical distortion introduced by the at least one optical element at that location. As a result, they are compatible with a wide range of optical architectures used in 3D display systems, including multiscopic and augmented-reality (AR) displays such as heads-up displays (HUDs) and head-mounted displays (HMDs).

For illustration purposes only, there will now be described how the aforementioned steps can be performed. It will be appreciated that the steps have been described with respect to the given eye of the individual one of the at least one user. These steps may be performed similarly for each eye of each individual one of the at least one user.

Throughout the present disclosure, the term "graphical element" encompasses:

font glyphs, such as letters, digits, and punctuation marks;

vector-based graphic primitives, such as user interface (UI) icons and visual indicators; and 2D and 3D UI elements, such as buttons, overlays, or interactive controls.

In the present disclosure, the term "graphical element hinting" refers to an adjustment of geometric features (for example, position, shape, thickness, or spacing) of any graphical element to align with perceived shapes and sizes of light-emitting elements in a display. Graphical element hinting is most suitable to be applied to vector-based graphical elements including, but not limited to, font glyphs, vector-based graphic primitives, and UI elements.

Determining Relative Location of Each Eye:

The tracker is used to determine the relative location of each eye of the at least one user with respect to the image plane of the 3D display. The tracker may include at least one visible-light camera, at least one infrared (IR) camera, or at least one depth camera, or a combination thereof. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. Tracking data may include images of the user's eyes, face, or head. The relative location of a given eye may be determined by detecting at least one feature of the given eye, such as a pupil centre, at least one corneal reflection, corners of the given eye or an eyelid contour, in the tracking data captured by the tracker.

The relative location of each eye with respect to the image plane may include translational offsets in horizontal, vertical, and depth directions, as well as orientation offsets if the user's head is rotated. The image plane of the 3D display can be a light-emitting surface of the display or an imaginary plane that is parallel to the light-emitting surface, in a case where the display is being directly viewed. Alternatively, the image plane can be an imaginary plane in another case where an optical combiner is employed to facilitate a reflected view. The term "image plane" refers to an intended location in space where at least one graphical element is perceived. This does not require the 3D display or other optical elements on the optical path to be physically planar. This definition applies irrespective of the optical configuration of the system, namely:

(i) in a case where a distorted image is displayed on a curved or non-curved display and reflected through a curved combiner, (ii) in a case where an undistorted image is displayed on a non-curved display and reflected through a non-curved combiner, (iii) in a case where an image is displayed on the display and viewed directly (without any optical combiner).

In some implementations, temporal filtering may be applied to smooth noise in estimates of the relative location of each eye. In other implementations, a predictive model may be used to compensate for latency by extrapolating the relative location of each eye based on recent motion patterns. The relative location of a given eye provides a spatial reference for subsequent computation of a sample map for the given eye.

Determining 3D View Frustum:

In some implementations, determining the 3D view frustum corresponding to the given eye comprises projecting a volume from the relative location of the given eye toward the image plane of the 3D display. The 3D view frustum may be modelled as a pyramidal or conical region whose apex is at the given eye and whose base intersects the image plane. The boundaries of the frustum may be defined based on optical parameters of the 3D display, such as a size of the array of light-emitting elements, a focal length of a lenticular array, or an aperture size of a parallax barrier.

In some implementations, the 3D view frustum is defined in a coordinate space relative to the 3D display. In other implementations, it may be defined in another coordinate space relative to real-world reference objects. For example, when the 3D display is integrated into an HUD, the 3D view frustum may be anchored to features of a windshield or dashboard to ensure accurate geometric mapping.

In some cases where an optical combiner is present, the 3D view frustum may be distorted by curvature and/or tilt of a semi-reflective surface of the optical combiner. In such implementations, the boundaries of the 3D view frustum are modelled to include optical warping introduced along the optical path from the 3D display to the given eye.

The 3D view frustum is updated dynamically as the relative location of the given eye changes, enabling the system to track how the set of light-emitting elements employed to display the graphical element to the given eye changes with head motion. The 3D view frustum thus defines a bounded volume within which light from light-emitting elements contributes to the perception of the graphical element to the given eye.

Determining Region of Array:

In some implementations, determining the region of the array of light-emitting elements to be employed to display the graphical element to the given eye comprises identifying light-emitting elements that emit light along directions within the 3D view frustum intersecting the intended position of the graphical element therein. As an example, forward-projection techniques may be employed, where a ray is traced from each light-emitting element through the at least one optical element to determine its direction of emission, the projection being modelled using the optical distortion parameters. As another example, back-projection techniques may be employed, where rays are extended from the given eye through the optical path to determine which light-emitting elements lie along those directions.

The determined region of the array may have irregular boundaries due to distortions introduced by the at least one optical element such as a lenticular array, a parallax barrier, or a curved optical combiner. In some implementations, the region may be represented as a non-rectangular subset of the array, and a lookup table may be pre-computed for efficient retrieval. Alternatively, the region may be represented as a mesh, a binary mask, or a mapping function stored in a graphics processing unit (GPU) memory for use in rendering pipelines. Optionally, when the position of the graphical element is known a priori, the region may be constrained further to those light-emitting elements whose projected directions intersect a bounding volume (for example, a box, sphere, or convex hull) corresponding to the spatial extent of the graphical element.

In some implementations, the region may be updated dynamically as the relative location of the given eye changes, ensuring that the set of light-emitting elements remains accurate under head motion or eye movement.

Generating Sample Map:

In some implementations, generating the sample map comprises computing, for each light-emitting element in the determined region of the array, at least three parameters from the perspective of the given eye: a perceived shape, a perceived size, and a relative perceived position.

The perceived shape may be determined by projecting a shape of a physical aperture of the light-emitting element through the at least one optical element onto a sphere centred at the location of the given eye. The projection may be modelled based on the optical distortion parameters of the at least one optical element and the spatial position of the light-emitting element within the array. The optical distortion parameters could include at least one of: a refractive index of a material of the at least one optical element, a focal length of the at least one optical element (such as a focal length of a lenticular lens in a lenticular array), a thickness of the at least one optical element, a pitch of the at least one optical element (in case of a lenticular array or a parallax barrier), a phase of the at least one optical element (in case of a lenticular array or a parallax barrier) relative to the array of light-emitting elements, a curvature of the at least one optical element (in case of an optical combiner). In a case where the at least one optical element includes an optical combiner, the curvature of the optical combiner may be defined using a geometric model comprising at least one of: radii of curvature along different axes, a relative orientation of the optical combiner with respect to the 3D display, optical distances between the 3D display and different points on a semi-reflective surface of the optical combiner.

Depending on the configuration, the projected shape may be distorted into polygons, ellipses, trapezoids, or sheared quadrilaterals. In some implementations, optical ray tracing is applied to determine an apparent distortion of the shape of the physical aperture of the light-emitting element by the at least one optical element. In other implementations, geometric approximation techniques or calibration data are employed to fit an analytical model of the apparent distortion, incorporating effects such as lens-induced magnification, parallax displacement, or aberration correction.

The perceived size may be defined as an angular extent or solid angle (e.g., steradians) subtended by the projected shape at the given eye. In some implementations, the angular extent may be expressed as a cone angle measured along principal axes, for example, distinguishing horizontal expansion from vertical expansion. In other implementations, the size is defined in terms of a polygonal region on a spherical projection surface, the polygon enclosing the projected shape of the aperture. Magnification effects introduced by a curved and/or tilted optical combiner may be incorporated when computing the perceived size, such that the sample map reflects distortion along both depth and lateral directions. Notably, the perceived shape may be distorted (for example, elongated along one axis) depending on the curvature and an incidence angle of the ray at the semi-reflective surface of the optical combiner. These effects are incorporated into computation of the angular region subtended by the light-emitting element, thereby improving the accuracy of the sample map.

The relative perceived position may be determined as an angular origin in the field of view of the given eye corresponding to a centroid of the projected shape. In some implementations, the relative perceived positions of the light-emitting elements are calculated by tracing direction vectors from the given eye toward the centres of the apertures of the light-emitting elements as redirected through the at least one optical element.

Each direction vector defines an angular origin point in the field of view of the given eye. An angular separation between angular origin points corresponding to different direction vectors of the light-emitting elements is used to determine the relative perceived positions of the light-emitting elements. The angular origin points may be defined on an imaginary surface corresponding to an outermost surface of the at least one optical element from which the redirected light exits. As an example, in a case where the at least one optical element includes a lenticular array, the relative perceived positions may be determined based on whether a focal length of a lenticular lens is greater than or smaller than an effective thickness of the lenticular lens along the viewing direction of the given eye.

The sample map thus provides a non-uniform, view-dependent layout of at least the region of the array that contributes to the graphical element. Herein, the term "sample map" refers to a data structure that encodes, for each light-emitting element in at least a region of the array, its perceived shape, perceived size, and relative perceived position as seen from a given eye.

The sample map may be generated for a larger region that includes and surrounds the region of the array. Alternatively, the sample map may be generated for an entirety of the array, enabling a global view-dependent mapping that can be re-used across multiple graphical elements. In either case, the sample map captures how the light-emitting elements are perceived by the given eye under current viewing geometry and optical distortion, and serves as the basis for adjusting the shape of the graphical element.

Adjusting Shape of Graphical Element:

In some implementations, adjusting the shape of the graphical element comprises modifying at least one of: an outline, a stroke thickness, or another spatial feature of the graphical element, so that it aligns with the non-uniform, view-dependent layout of the light-emitting elements indicated in the sample map. The adjustment may be performed in such a way that features of the graphical element correspond to perceived relative positions, sizes, and shapes of the light-emitting elements as determined for the given eye.

In some implementations, vector-based adjustments may be applied, where control points of Bézier curves or other vector primitives defining the graphical element are modified to conform to the sample map. In other implementations, raster-based adjustments may be performed, where a bitmap or texture representation of the graphical element is resampled or remapped according to the sample map. Optionally, constraints may be applied during adjustment to preserve proportions or aspect ratios of the graphical element within predefined tolerances.

The adjustment process enables the graphical element to be represented consistently on the non-uniform layout of light-emitting elements, thereby maintaining its intended spatial appearance as perceived by the given eye under view-dependent distortion of the 3D display.

Selecting Set of Light-Emitting Elements:

Selecting the set of light-emitting elements from the determined region is performed simultaneously with adjusting the shape of the graphical element, such that features of the graphical element are mapped directly onto the non-uniform, view-dependent layout of the light-emitting elements indicated in the sample map. The selection comprises identifying those light-emitting elements whose perceived positions, shapes, and sizes correspond to the adjusted graphical element.

In some implementations, the selection may be performed by evaluating whether an angular projection of the adjusted graphical element overlaps with an angular region subtended by each light-emitting element in the set as defined in the sample map. In other implementations, the selection may be implemented as a sampling operation in which the graphical element is evaluated in angular coordinates defined by the sample map, and light-emitting elements whose coordinates lie within the boundaries of the adjusted graphical element are selected.

Optionally, selection may include applying constraints to ensure that the selected set of light-emitting elements corresponds accurately and consistently to the adjusted graphical element without introducing redundancy. The selected set thereby defines a non-uniform subset of the array that is employed to display the graphical element to the given eye, based on the view-dependent layout of the light-emitting elements encoded in the sample map.

Employing Set of Light-Emitting Elements

In some implementations, employing the set of light-emitting elements comprises computing colour values for each light-emitting element based on the adjusted shape of the graphical element and driving the 3D display to emit light accordingly. Throughout the present disclosure, the term "colour value" encompasses both colour and intensity of a given light-emitting element. If the graphical element is represented as a vector glyph, evaluating curve equations may determine whether a given light-emitting element lies inside or outside the outline of the graphical element, and shading techniques may be applied to compute the colour value. If the graphical element is an icon or vector shape, similar evaluation may be used based on its primitives.

Optionally, anti-aliasing may be performed by weighting contributions based on the proportion of overlap between the graphical element and the angular region subtended by each element. In some implementations, these computations may be implemented in a shader program executing on a GPU, treating each light-emitting element as an individual sample with unique shape and position.

The employed set produces a synthetic light field in which the graphical element appears aligned, legible, and stable from the perspective of the given eye, despite distortions introduced by the at least one optical element of the 3D display. In this way, respective colour values for the light-emitting elements that emit light toward the given eye are computed based on the relative location of the given eye and the optical distortion parameters, thereby ensuring that the graphical element appears at its intended spatial position and angular extent in the field of view of the given eye. This ensures that the synthetic light field produced by the selected set of light-emitting elements reflects the intended spatial appearance of the graphical element, without reliance on intermediate resampling or reprojection stages.

In some implementations, adjusting the shape of the graphical element further comprises aligning and snapping the shape of the graphical element to the perceived shapes and the perceived sizes of the light-emitting elements in the set. Optionally, when adjusting the shape of the graphical element, the at least one processor is configured to snap the graphical element to the perceived shapes and the perceived sizes of the light-emitting elements in the set by performing at least one of:

- adjusting a thickness of the outline of the graphical element, while maintaining the thickness within a predefined thickness range;
- shifting the outline of the graphical element, while maintaining a spacing between the graphical element and an adjacent graphical element within a predefined spacing range.

The snapping is performed in correspondence with the angular regions subtended by the light-emitting elements, as indicated in the sample map. This snapping operation may be performed in a vector domain, where control points of Bezier curves or other vector primitives are shifted such that strokes or outlines align with perceived boundaries of light-emitting elements. As an example, successive font glyphs in a word or icons in a user interface may be snapped in this manner.

The predefined thickness range and/or the predefined spacing range may be stored in a font metric table, a rendering policy, or a calibration dataset. These predefined ranges may be expressed in angular terms (e.g., cone angles subtended at the given eye) or in display-specific terms (e.g., sub-multiples of a pitch of a multiscopic optical element). Constraints imposed by these predefined ranges prevent over-adjustment, thereby maintaining visual proportions and avoiding excessive distortion.

In cases where perceived sizes of light-emitting elements vary asymmetrically across the sample map, the snapping may be performed by applying compromise adjustments that maintain consistent outline thickness and spacing across multiple glyphs in a line or paragraph of text. For example, when the graphical element is a font glyph in a line of text, the predefined thickness range and spacing range may be selected to preserve perceptual consistency of thickness and spacing across the entire line, despite variations in the perceived sizes of the light-emitting elements due to view-dependent optical distortion. Such compromise adjustments ensure typographic uniformity across rendered text passages and avoid distracting variations introduced by asymmetric sampling.

The snapping may be applied dynamically as the sample map changes with user motion, ensuring that the graphical element continues to align with the perceived shapes and sizes of the light-emitting elements as perceived by the given eye.

By snapping the shape of the graphical element to the perceived shapes and sizes of the light-emitting elements, the system ensures that graphical features are anchored to perceptually active regions of the array. This provides improved stability and clarity of fine details such as glyph stems, serifs, or diacritical marks that would otherwise become blurred or inconsistent under non-uniform sampling.

Constraining the outline thickness to the predefined thickness range allows the system to compensate for variations in perceived sizes of light-emitting elements without altering the intended proportions of the graphical element. Similarly, preserving spacing within the predefined spacing range maintains legibility and aesthetic uniformity across adjacent graphical elements, preventing collisions or irregular spacing that could arise from distortion in the sample map.

Overall, the snapping process improves perceptual consistency of graphical elements across dynamic viewing conditions, ensuring that text and UI graphics remain visually coherent, legible, and aesthetically pleasing even under distortions introduced by the at least one optical element of the 3D display. As a result, the snapping process enhances usability in contexts such as small-type rendering, dense user interfaces, and AR overlays, where maintaining readability under distortion is critical.

Moreover, in some implementations, the graphical element is a font glyph, wherein, when adjusting the shape of the graphical element, the at least one processor is configured to snap at least one font shape feature of the font glyph to a subset of the set of light-emitting elements by performing at least one of:

- increasing a size of the at least one font shape feature;
- adjusting a position of the at least one font shape feature.

The at least one font shape feature may include at least one of: a stem, a serif, a terminal, a bowl, a counter, a diacritical mark of the font glyph. The snapping may be performed by increasing the size of the at least one font shape feature so that it coincides with or spans perceived shapes of light-emitting elements in the subset indicated in the sample map. In some implementations, the size may be increased along at least one direction (such as vertical or horizontal in the field of view of the given eye). Such an adjustment allows font shape features such as vertical stems of the letters “I” or “l” to remain perceptible despite distortions or reduced effective resolution of the 3D display.

Alternatively or additionally, the snapping may be performed by adjusting the position of the at least one font shape feature so that it overlaps with a perceived angular region subtended by a light-emitting element, rather than lying within a dead zone or at a boundary between light-emitting elements. As an example, a dot above the letter “i” or an accent mark may be shifted to coincide with a visible angular region, ensuring its consistent perceptibility.

The snapping of the at least one font shape feature may be performed under constraints to preserve typographic proportions and stylistic consistency of the font. Such constraints may be stored in a font metric table or a rendering policy, and may include at least one of:

a predefined size range (in which case the at least one font shape feature is maintained within the predefined size range), a predefined maximum allowable adjustment for the size, a predefined maximum allowable adjustment for the position.

The snapping may be applied dynamically as the sample map changes with user motion, such that font features remain anchored to perceptually active regions of the array as perceived by the given eye.

By snapping font shape features of font glyphs to a subset of the light-emitting elements, the system ensures that critical typographic components are consistently rendered in perceptually visible regions of the 3D display. This improves the legibility of text at small point sizes, where stems, serifs, or diacritical marks may otherwise become blurred, uneven, or entirely absent due to non-uniform sampling of the array. The use of constraints maintains typographic fidelity, so that font glyphs remain aesthetically consistent with the intended design while adapting to the distorted geometry of the 3D display. Overall, this approach enhances the clarity, stability, and recognizability of text in 3D displays, ensuring that font glyphs remain legible and typographically accurate even under optical distortions, reduced effective resolution, and dynamic user motion. This is particularly beneficial for multilingual text rendering, where diacritical marks and accent features are essential for correct semantic interpretation.

Although described with respect to font glyphs, a similar principle may be applied to other graphical elements. For example, critical or distinctive features of non-textual graphical elements, such as traffic sign symbols or icons in a user interface, may also be adjusted in size and/or position to ensure that they remain identifiable under low sample resolution or optical distortion.

Furthermore, in some implementations, the graphical element is a font glyph, wherein, when selecting the set of light-emitting elements, the at least one processor is configured to include, in the set, light-emitting elements that align perceptually with at least one of: a top boundary of the font glyph, a bottom boundary of the font glyph, based on at least one font alignment feature.

The at least one font alignment feature comprises at least one of: a baseline, an x-height, a cap height, an ascender line, or a descender line. The baseline is the line upon which letters sit. The x-height is the height of the lowercase “x”; it typically defines the height of the main body of lowercase letters. The cap height is the height of capital letters. The ascender line is the line that corresponds to the top of ascenders in lowercase letters; it may extend above the cap height in certain typefaces. The descender line is the line that corresponds to the lowest point reached by the descenders of lowercase letters such as “g” or “y.” These alignment features may be defined in the font metrics and stored in a font metric table for use during rendering.

To perform the selection, the top boundary and/or the bottom boundary of the font glyph is mapped onto the sample map, and those light-emitting elements whose perceived positions coincide with, or lie within a predefined threshold distance of, the mapped boundary are included in the set. For example, for a capital letter “H,” the top boundary may correspond to the cap height and the bottom boundary to the baseline. Including light-emitting elements aligned with these boundaries ensures that the horizontal strokes at the top and bottom are anchored to perceptually visible regions of the array.

In some implementations, the font glyph is part of a line of text comprising a plurality of glyphs. In such cases, the light-emitting elements selected for each font glyph are aligned perceptually with light-emitting elements selected for adjacent glyphs along the same font alignment feature, so that baselines, x-heights, and cap heights remain continuous across the line of text.

The alignment may be constrained by respective predefined threshold values for different font alignment features. These predefined threshold values may be expressed in angular terms derived from the sample map, thereby accounting for distortions introduced by the at least one optical element, such as stretching, shearing, or shifting caused by a lenticular array, a parallax barrier, or a curved or tilted optical combiner. Optionally, the selection of boundary-aligned light-emitting elements is updated dynamically as the sample map changes with user motion, ensuring that the boundaries of the font glyph remain perceptually aligned in real time with the intended font alignment feature(s).

By aligning glyph boundaries with perceptually visible regions of the array based on font alignment features, the system preserves typographic structure under view-dependent optical distortion. Anchoring boundaries such as the baseline, x-height, cap height, ascender line, and descender line ensures that vertical alignments remain stable and visually consistent as perceived by the given eye. When applied across a line of text, this approach maintains continuity across glyphs, preventing irregularities that could otherwise make text appear wavy, fragmented, or misaligned.

Constraining alignment using predefined thresholds keeps adjustments perceptually accurate without introducing excessive distortion, thereby maintaining proportionality and preserving typographic hierarchy. Overall, this process improves the clarity, readability, and visual uniformity of text in 3D displays, ensuring that glyphs remain legible and structurally accurate under optical distortions, reduced effective resolution, and dynamic user motion. This enhances usability in contexts where precise text alignment is critical, such as AR overlays, HUDs, and immersive interfaces.

Moreover, optionally, the at least one processor is configured to:

identify one or more regions in the array in which light emitted by light-emitting elements is not perceptually visible to the given eye, based on the sample map; and when adjusting the shape of the graphical element, perform at least one of:

adjusting a thickness of an outline of the graphical element to avoid use of the one or more regions, while maintaining the thickness within a predefined thickness range;

shifting the outline of the graphical element to avoid use of the one or more regions, while maintaining a spacing between the graphical element and an adjacent graphical element within a predefined spacing range.

These one or more regions may occur where light-emitting elements are occluded (for example, stripes of light-emitting elements whose emitted light is blocked by a parallax barrier), where their emission projects to angular regions too narrow to be perceptible (for example, light-emitting elements whose emission appears too thin near boundaries of lenticular lenses), or where emitted light is redirected outside the field of view of the given eye. Such regions correspond to perceptual dead zones where graphical features would otherwise be lost or distorted if mapped directly onto the underlying light-emitting elements.

The predefined thickness range and the predefined spacing range may be defined as described earlier. By constraining adjustments within these predefined ranges, the system preserves proportions and prevents overcompensation when avoiding the identified one or more regions.

In some implementations, dead zone avoidance is applied to font glyphs, ensuring that stems, serifs, and other fine typographic details remain perceptible in full without falling into occluded or imperceptible areas. For example, if a vertical stroke of a glyph would otherwise intersect with a dead zone created by a parallax barrier stripe, the stroke thickness may be widened slightly or its position shifted so that it remains anchored within perceptually visible light-emitting elements.

In other implementations, dead zone avoidance may be extended to 2D and 3D graphical elements in a user interface layout. For such cases, the system may dynamically generate a perceptual layout of light-emitting elements based on the sample map, thereby positioning graphical elements so that they avoid regions of the array that are not perceptually visible to the given eye. This ensures that icons, overlays, or interactive controls remain perceptible and stable even under non-uniform sampling conditions introduced by the at least one optical element.

The adjustment process may be performed dynamically as the sample map changes with user motion, such that dead zones are avoided in real time and graphical elements remain perceptually intact and legible under changing head position or eye movement.

By avoiding perceptual dead zones, the system prevents gaps, discontinuities, or missing features in glyphs and UI elements. Adjusting outline thickness within the predefined thickness range preserves proportionality and stroke consistency, while shifting outlines within the predefined spacing range maintains uniform spacing between adjacent glyphs or icons. Together, these constraints ensure that graphical elements remain coherent and stable even when reallocated away from non-visible regions.

This approach improves the clarity and legibility of text and UI elements, particularly in 3D displays where dead zones may arise from parallax barrier apertures, lenticular lens edges, or curved optical combiners. By dynamically adapting to user motion, the system maintains anchored graphical features and consistent appearance across frames, enhancing perceptual stability.

Overall, this approach minimizes artifacts introduced by dead zones, preserves coherent thickness and spacing of graphical elements, and ensures robust readability of text and graphics under varying optical distortions and dynamic viewing conditions. This leads to improved usability in contexts such as AR overlays, HUDs, and dense UI presentations, where even small discontinuities can impair comprehension.

Furthermore, optionally, the at least one processor is configured to:

determine whether at least one of: a size of the graphical element, a spacing between the graphical element and an adjacent graphical element, is permitted to vary within a predefined tolerance range; and when it is determined that the at least one of: the size, the spacing is permitted to vary, adjust at least one of: the size, the spacing to snap the graphical element to the perceived shapes and the perceived sizes of the light-emitting elements in the set.

In some implementations, the predefined tolerance range is stored in a font metric table, a rendering policy, or a calibration dataset. For example, the predefined tolerance range for font glyph size may be expressed as a percentage of nominal font height (e.g., +3%), while the predefined tolerance range for spacing may be expressed as a fraction of the nominal inter-glyph spacing (e.g., +2%). These predefined tolerance ranges define the degree to which the visual proportions of glyphs and their spacing may be altered without compromising readability or typographic integrity.

When the tolerance permits variation, the processor may increase or decrease the size of the graphical element, or compress or expand spacing between adjacent graphical elements, in order to align with the perceived shapes and perceived sizes of the light-emitting elements indicated in the sample map. For example, when a glyph outline would otherwise fall across multiple non-uniform boundaries between light-emitting elements, the glyph may be scaled slightly so that its font shape features align more closely with the active regions of the light-emitting elements. Similarly, when spacing between two glyphs would otherwise map to a dead zone or irregular boundary, the spacing may be expanded or contracted within the tolerance to anchor both glyphs to perceptually visible regions.

This adjustment process may be applied dynamically, adapting the size and/or spacing of glyphs in real time as the sample map changes with head or eye motion. Constraints ensure that adjustments do not exceed the predefined tolerance range, thereby maintaining overall consistency of font appearance across words, sentences, or UI layouts.

Allowing controlled variation in size or spacing within the predefined tolerance range gives the rendering process flexibility to snap features to optimal perceptual positions, while preserving typographic proportions. This improves alignment with visible regions of the array, avoids gaps or overlaps caused by non-uniform sampling, and maintains legibility across dynamic viewing conditions.

Furthermore, in some implementations, the 3D display is implemented as an autostereoscopic display or a multiscopic display. Optionally, in such implementations, the at least one processor is configured to:

determine another region of the array of light-emitting elements to be employed to display the graphical element to another eye of the individual one of the at least one user, based on the position of the graphical element within the 3D view frustum;

generate another sample map indicating perceived shapes, perceived sizes and relative perceived positions of light-emitting elements in at least the another region of the array, from a perspective of the another eye, based on a relative location of the another eye with respect to the image plane and on the optical distortion parameters of the at least one optical element; and select another set of light-emitting elements from the another region of the array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

The 3D view frustum may be defined separately for each eye. Alternatively, the 3D view frustum may be defined as a common 3D view frustum corresponding to an intersection of individual 3D view frustums of the given eye and the another eye, thereby identifying regions that are simultaneously perceptible to both.

The perceived shapes, perceived sizes, and relative perceived positions of light-emitting elements in at least the another region of the array, from the perspective of the another eye, can be determined as described earlier. The another set of light-emitting elements may likewise be selected from the another region of the array for displaying the graphical element to the another eye, as described earlier.

Notably, the another set of light-emitting elements is selected jointly with the set of light-emitting elements selected for the given eye. In this joint selection process, adjustment of the shape of the graphical element is performed as a binocular compromise, ensuring that snapping to the perceived shapes and perceived sizes of the light-emitting elements provides consistency for both eyes simultaneously. This prevents the situation where optimization for one eye introduces distortion or instability in the other.

By generating sample maps for both eyes and jointly selecting the sets of light-emitting elements, the system ensures that the graphical element remains stable and perceptually consistent under binocular viewing conditions. The use of a common 3D view frustum provides a reliable reference space, ensuring that the regions of the array contributing to the graphical element are aligned across both eyes.

The binocular compromise in snapping ensures that outlines, stroke thicknesses, and critical features of font glyphs and UI elements are preserved in a way that is coherent from both viewpoints. This avoids interocular inconsistencies such as ghosting, double contours, or mismatched feature placement, while still respecting the local perceived shapes and sizes of light-emitting elements.

Overall, this approach improves stereo clarity, prevents user discomfort caused by inconsistent rendering across eyes, and ensures accurate stereo perception of text and graphics. This is particularly beneficial in AR overlays and HUD contexts, where stable binocular rendering of labels, icons, or UI indicators is critical for readability and depth fidelity.

In other implementations, the 3D display is implemented as a stereoscopic display. Optionally, in such implementations, the 3D display further comprises:

another array of light-emitting elements; and at least one another optical element arranged on an optical path of the another array of light-emitting elements, wherein the at least one processor is configured to:

determine another region of the another array of light-emitting elements to be employed to display the graphical element to another eye of the individual one of the at least one user, based on the position of the graphical element within the 3D view frustum;

generate another sample map indicating perceived shapes, perceived sizes and relative perceived positions of light-emitting elements in at least the another region of the another array, from a perspective of the another eye, based on a relative location of the another eye with respect to the image plane and on optical distortion parameters of the at least one another optical element; and select another set of light-emitting elements from the another region of the another array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

As mentioned earlier, the 3D view frustum may be defined separately for the given eye and the another eye, or may be defined as a common 3D view frustum. The steps of generating the another sample map and selecting the another set of light-emitting elements may be performed as described earlier, with optical distortion parameters specific to the at least one another optical element.

Notably, the selection of the another set is performed jointly with the selection of the set corresponding to the given eye. In this joint selection, adjustment of the shape of the graphical element is performed as a binocular compromise, ensuring that snapping to perceived shapes and sizes of light-emitting elements maintains consistency for both eyes. This compromise avoids the situation where optimization for one eye introduces distortion, instability, or misalignment in the other.

By generating sample maps for both arrays and jointly selecting the sets of light-emitting elements, the system ensures that the graphical element remains stable, coherent, and perceptually accurate under binocular viewing. The use of a common 3D view frustum provides a shared reference space for stereo rendering, ensuring that the spatial layout of the graphical element is perceived consistently by both eyes.

The binocular compromise in snapping ensures that outlines, stroke thicknesses, and critical features of font glyphs and UI elements are preserved in a way that is coherent across the two eyes, even though they are rendered by separate arrays and optical elements. This prevents stereo artifacts such as ghosting, double contours, or inconsistent edge placement, while maintaining correct stereo depth cues.

Overall, this stereoscopic implementation improves clarity, stereo comfort, and readability of text and graphics. It ensures that both eyes receive perceptually consistent images, preserving typographic detail and spatial coherence. This is especially advantageous in AR or VR headsets and other stereoscopic displays, where accurate stereo reproduction of UI overlays, icons, and font glyphs is critical for reducing user fatigue and ensuring correct depth perception.

Moreover, optionally, the graphical element is a font glyph in a line of text comprising a plurality of font glyphs, and wherein the at least one processor is configured to:

select respective sets of light-emitting elements for displaying the plurality of font glyphs to the given eye; and select respective other sets of light-emitting elements for displaying the plurality of font glyphs to the another eye, wherein the plurality of font glyphs are displayed at a same optical depth.

To perform this process, each font glyph in the line of text is mapped onto the sample map corresponding to the given eye, and a respective set of light-emitting elements is selected as described earlier for individual glyphs. Similarly, each font glyph in the line is mapped onto the another sample map corresponding to the another eye, and another respective set of light-emitting elements is selected. The respective sets and the respective other sets are selected jointly, ensuring binocular consistency of the displayed glyphs.

The same optical depth is maintained by anchoring the perceived positions of corresponding glyphs for both eyes at a common depth plane in the field of view. In some implementations, this is achieved by constraining the binocular compromise in snapping so that font glyphs align not only with the perceived shapes and sizes of light-emitting elements, but also with the intended font alignment features (for example, baseline, x-height, or cap height) at the same perceived depth plane. This perceived depth plane corresponds to a stereo convergence depth (namely, the depth at which the images for the two eyes fuse) at which the glyphs from both eyes fuse coherently, ensuring that the line of text is read comfortably without vergence-accommodation mismatch.

In implementations where a common 3D view frustum is defined as the intersection of individual view frustums of the two eyes, the line of text is constrained to lie within this common 3D view frustum. This ensures that all glyphs in the line are perceptible to both eyes and appear at the same optical depth when fused binocularly.

The line of text may comprise a plurality of font glyphs rendered with shared alignment features, such as a continuous baseline, which are preserved across both eyes. As such, the selection process ensures that respective sets and another sets align perceptually, preventing discontinuities between glyphs when viewed binocularly. Maintaining these shared alignment features across both eyes further ensures that the plurality of glyphs in the line are perceived at the same stereo convergence depth, thereby presenting the line of text at a common optical depth plane in the field of view.

By jointly selecting respective sets of light-emitting elements for the given eye and respective other sets for the another eye, the system ensures that all font glyphs in a line of text are rendered consistently across both viewpoints. This prevents binocular mismatches that could otherwise cause discontinuities or double contours in the perceived text.

Anchoring glyphs to a common perceived depth plane corresponding to the stereo convergence depth ensures that the line of text appears fused and stable for both eyes. This reduces vergence-accommodation conflict, prevents user discomfort, and improves reading fluency.

Maintaining font alignment features such as the baseline, x-height, and cap height across both eyes further preserves typographic structure and prevents visual drift or misalignment between glyphs when viewed binocularly. This continuity allows entire words and sentences to be read without perceptual distortion, even when user motion or optical distortion affects sampling.

The use of a common 3D view frustum, defined as the intersection of frustums of both eyes, ensures that all glyphs lie within a binocularly visible region, further enhancing stability. Together, these measures provide improved clarity, legibility, and comfort for text rendering in 3D displays, enabling reliable presentation of paragraphs, labels, and UI text overlays.

Overall, the approach ensures binocularly coherent text that remains comfortable, stable, and easily interpretable across dynamic viewing conditions. This is particularly advantageous in AR overlays and HUDs, where text stability and readability are critical for real-time comprehension.

Furthermore, optionally, the system further comprises at least one real-world-facing camera, wherein the at least one processor is configured to:

capture at least one real-world image of a real-world environment whose real-world light field is optically combined with a synthetic light field produced by the 3D display, using the at least one real-world-facing camera;

determine, for each light-emitting element in the region of the array, at least one of: (i) a colour of a portion of the real-world light field corresponding to a direction in which light from said light-emitting element is directed toward the given eye, (ii) an intensity of the portion of the real-world light field, (iii) a distance between the given eye and a real-world object located along the direction, (iv) a motion vector indicating motion of the real-world object relative to the image plane, based on the at least one real-world image; and when adjusting the shape of the graphical element, adjust a thickness of an outline of the graphical element based on the at least one of: (i) the colour, (ii) the intensity, (iii) the distance, (iv) the motion vector.

In some implementations, the at least one real-world image is analysed to determine, for each light-emitting element in the region of the array, at least one parameter of the real-world environment along the direction in which light from the light-emitting element is redirected toward the given eye by the at least one optical element. This direction is determined based on the forward projection process, taking into account the relative location of the given eye with respect to the image plane and the optical distortion parameters of the at least one optical element.

The at least one real-world image may be sampled along this direction to determine a colour of the portion of the real-world light field or an intensity value corresponding to a luminance of a real-world region from which light is expected to arrive at the given eye. A distance between the given eye and the real-world object located along the direction may be determined using a depth map captured by at least one depth camera, or by stereo image processing when the at least one real-world-facing camera comprises two or more cameras. Additionally, a motion vector indicating motion of the real-world object relative to the image plane may be determined through optical flow analysis or motion estimation techniques applied to a sequence of real-world images.

When adjusting the shape of the graphical element, outline thickness is adjusted within the predefined thickness range according to these parameters. For example, if the intensity of the portion of the real-world light field exceeds a predefined threshold intensity, the outline thickness may be increased to maintain contrast and legibility in bright conditions. Conversely, when the intensity falls below another predefined threshold intensity, the outline thickness may be reduced to avoid excessive haloing or overlap in low-light conditions. If the motion vector indicates that the real-world object is moving at a velocity greater than a predefined threshold velocity, the outline thickness may be increased to reduce perceptual effects of motion blur and to maintain prominence of the graphical element. When the distance between the given eye and the real-world object is greater than the perceived depth of the graphical element by more than a predefined threshold difference, the at least one real-world image may be defocus-blurred prior to determining the colour or intensity of the portion of the real-world light field. This ensures that distant background regions do not artificially diminish the prominence of the graphical element during outline adjustment.

By incorporating parameters from the real-world image, the system dynamically adapts the outline thickness of graphical elements to the surrounding environment. This adaptation maintains perceptual visibility and legibility when the synthetic light field is combined with the real-world light field.

Adjusting outline thickness according to background intensity preserves local contrast, allowing glyphs and UI elements to remain distinct against bright surfaces and to avoid excessive haloing in darker regions. Adapting to detected motion vectors counteracts perceptual blur caused by fast-moving real-world objects, ensuring that critical text or icons remain visually prominent even in dynamic scenes. Applying defocus blur to distant background regions prior to sampling prevents far-away features from reducing the prominence of nearby graphical elements, stabilizing their visual appearance.

Importantly, the adjustments are applied consistently across all glyphs within a line of text. This preserves uniform line thickness and spacing, avoiding uneven stroke weights that could otherwise arise from local variations in the real-world background. Maintaining such typographic stability allows words, sentences, and paragraphs to be read fluently without distracting fluctuations in character appearance.

Overall, this capability enables synthetic graphical elements to remain perceptually coherent under varying brightness, depth relationships, and motion conditions in the real world. The result is improved readability, reduced eye strain, and stable integration of AR overlays, HUD elements, and other text-intensive displays where reliable fusion of virtual content with real-world imagery is essential.

Moreover, optionally, the at least one processor is configured to:

- determine a velocity at which the graphical element is moving across a sequence of frames;
- determine whether the velocity exceeds a predefined velocity threshold; and
- when it is determined that the velocity exceeds the predefined velocity threshold, suppress adjusting the shape of the graphical element based on the sample map.

The velocity may be computed by tracking the position of the graphical element in successive frames relative to the image plane, or in angular coordinates of the field of view as derived from the sample map.

The predefined velocity threshold may be defined in terms of angular velocity (for example, degrees per second as perceived by the given eye) or in terms of pixel displacement between successive frames. The predefined velocity threshold may be stored in a rendering policy, a calibration dataset, or a user-defined preference. It may be selected to reflect a perceptual limit above which shape adjustments are less likely to be noticeable to the given eye.

When it is determined that the velocity exceeds the predefined velocity threshold, adjustment of the shape of the graphical element based on the sample map is suppressed. In such cases, the graphical element is rendered without applying snapping or outline modifications derived from the non-uniform, view-dependent layout of the light-emitting elements. This suppression reduces temporal instability that could otherwise arise from rapid, frame-to-frame changes in the adjusted outline of the graphical element.

In some implementations, the suppression may be applied selectively. For example, suppression may apply only to fine-grained adjustments (such as snapping diacritical marks to perceived light-emitting elements), while coarse alignment (such as anchoring the baseline of a line of text) remains active. Moreover, suppression may be toggled off again once the velocity of the graphical element falls below the predefined velocity threshold, restoring full sample-map-based adjustment.

Through this approach, the system avoids applying frequent micro-adjustments that would otherwise cause perceptual flicker, instability, or "swimming" of the graphical element across frames. Suppressing sample-map-based adjustment during rapid motion ensures that glyphs and UI elements remain temporally coherent and stable in appearance, even if fine local corrections to outline thickness or snapping are momentarily paused. This is particularly beneficial when the user is scanning their eyes quickly across text, when UI elements are animated, or when head motion causes rapid shifts in the perceived sample map.

The predefined velocity threshold provides a perceptual safeguard: when motion is fast enough that the given eye cannot resolve small distortions, adjustments are suppressed to prioritize stability over local accuracy. When motion slows again, adjustments are reinstated, allowing fine features such as serifs, counters, or icons to be snapped accurately to the perceived layout of light-emitting elements.

Overall, this approach balances perceptual fidelity and temporal stability. It prevents distracting fluctuations in glyph shape or outline thickness during high-velocity movement, reduces visual fatigue caused by rapid micro-adjustments, and ensures that graphical elements remain legible and coherent across dynamic conditions. This improves usability in contexts such as AR overlays, HUDs, and animated UI transitions, where both clarity and stability are critical to user comprehension.

Additionally, optionally, the at least one processor is configured to:

- when it is determined that the velocity exceeds the predefined velocity threshold,
  - determine respective emission intensities of adjacent light-emitting elements in the set based on a sub-element position of the graphical element for a given frame; and
  - when employing the set of light-emitting elements to emit the light, emit light from the adjacent light-emitting elements with the respective emission intensities.

When it is determined that the velocity of the graphical element exceeds the predefined velocity threshold, the at least one processor is configured to determine the sub-element position of the graphical element for the given frame. The sub-element position represents a fractional overlap of the graphical element with boundaries between adjacent light-emitting elements as indicated in the sample map.

The adjacent light-emitting elements are then driven at the respective emission intensities proportional to this fractional overlap, such that the graphical element is perceptually positioned between them. For example, if the sub-element position lies 30% of the way into a neighbouring light-emitting element, that element may be driven at 30% of the intended intensity, while the adjacent light-emitting element is driven at 70%. This weighted distribution simulates sub-element positioning of the graphical element and provides smoother transitions across the array.

This process allows the graphical element to be rendered at apparent positions finer than the pitch of the light-emitting elements, even when shape adjustment based on the sample map is suppressed due to high velocity. The weighted emission intensities are applied dynamically for each frame, ensuring that the graphical element maintains perceptual continuity while moving rapidly across the array.

This approach simulates finer-than-pixel placement of graphical features, avoiding perceptual "jumping" that could occur if outlines were constrained only to discrete element boundaries. By enabling smoother transitions across light-emitting elements, it improves motion fluidity, reduces aliasing, and preserves readability of fast-moving text or icons.

Together with the suppression of shape adjustment, weighted emission ensures that graphical elements remain perceptually continuous and stable under rapid motion, which is particularly beneficial for AR overlays, HUDs, and dynamic UI contexts.

More additionally, optionally, the at least one processor is configured to:

when it is determined that the velocity exceeds the predefined velocity threshold,
  determine a motion trajectory of the graphical element across the sequence of frames; and
  select the set of light-emitting elements for the given frame, based on the motion trajectory of the graphical element.

The motion trajectory may be determined by analysing the positions of the graphical element across consecutive frames and computing direction and velocity components of its motion relative to the image plane. In some implementations, the trajectory is represented as a vector indicating displacement per unit time. In other implementations, the trajectory is represented as a spline, curve fit, or predictive filter (for example, a Kalman filter) that extrapolates sub-frame positions of the graphical element, accounting for both linear and non-linear motion.

Based on the determined motion trajectory, the set of light-emitting elements for the given frame are selected so as to optimize the smoothness of the perceived motion. This may include anticipating the next sub-element position of the graphical element along the trajectory and allocating emission to light-emitting elements such that transitions across frames appear continuous. In some implementations, emission is distributed or temporally blended across neighbouring light-emitting elements that lie along the predicted path of the graphical element, ensuring that motion is represented as a smooth sweep rather than discrete jumps.

The trajectory-based selection is updated dynamically as new frames are processed, allowing the system to adapt to changing velocity or direction. This enables perceptually stable rendering of fast-moving text, icons, or graphical indicators, even when their positions traverse multiple light-emitting elements within a single frame interval.

By determining the motion trajectory of fast-moving graphical elements and selecting light-emitting elements accordingly, the system optimizes animation smoothness under high-velocity conditions. This prevents perceptual stuttering, ghosting, or stepwise jumps that would otherwise occur if light-emitting element selection were limited to instantaneous frame positions.

Trajectory-aware selection ensures that glyphs, icons, and other UI features appear to glide smoothly across the display, preserving their recognizability even at high speeds. The use of predictive blending further reduces temporal aliasing, producing motion that is fluid and natural to the user's eye.

Overall, this approach enhances readability and perceptual stability of text and graphics during rapid motion, improving usability in AR overlays, HUDs, and immersive interfaces where users must reliably track moving information in real time.

Furthermore, optionally, the at least one processor is configured to:

determine at least one of: a direction of adjustment, a magnitude of adjustment applied to the shape of the graphical element in at least one previous frame; and
when adjusting the shape of the graphical element, employ at least one of: an adjustment direction, an adjustment magnitude that matches the at least one of: the direction, the magnitude of adjustment applied in the at least one previous frame.

The direction of adjustment may correspond to whether an outline, stroke, or font shape feature was shifted leftward, rightward, upward, or downward within the field of view of the given eye. The magnitude of adjustment may correspond to the degree of outline movement or stroke thickness modification applied, expressed for example in angular terms (e.g., cone angle increments) or in display-specific units (e.g., fractions of the pitch of the light-emitting elements).

When adjusting the shape of the graphical element in the current frame, an adjustment direction and/or an adjustment magnitude consistent with those applied in the at least one previous frame are employed. In some implementations, the processor enforces temporal consistency by preferentially extending adjustments along the same direction across successive frames. In other implementations, the processor constrains the adjustment magnitude to remain close to the previously applied value, avoiding large frame-to-frame fluctuations.

This temporal consistency mechanism can be implemented as a smoothing filter, where historical adjustment vectors are stored and used to bias new adjustments. Alternatively, predictive models may extrapolate adjustment trends, such that if a graphical element is consistently being widened or shifted due to local distortion, the adjustment is carried forward in the same direction with controlled incremental updates.

By taking the temporal axis into account, the system prevents frame-to-frame jitter, flicker, or oscillation of glyph outlines and UI elements. This ensures that strokes, serifs, or diacritical marks remain stable as perceived by the given eye, improving visual comfort and readability in AR, HUD, and other dynamic 3D display contexts.

For illustration purposes only, there will now be described how various components of the system can be implemented. The at least one processor controls an overall operation of the system. The at least one processor is communicably coupled to the tracker, the 3D display and, optionally, the at least one real-world-facing camera. Optionally, the at least one processor is implemented as a processor of the 3D display. Alternatively, optionally, the at least one processor is implemented as a processor of a computing device that is communicably coupled to the 3D display. Examples of the computing device include, but are not limited to, a laptop, a desktop, a tablet, a phablet, a personal digital assistant, a workstation, and a console. Examples of the processor include, but are not limited to, GPU, CPU and ASIC. Additionally, optionally, the at least one processor is implemented at least in part as a cloud server (namely, a remote server) that provides a cloud computing service.

The 3D display can be implemented in various ways. Throughout the present disclosure, the term "3D display" encompasses:

- a stereoscopic display, such as an HMD (like a virtual-reality (VR) or augmented-reality (AR) headset), or a 3D television (3D TV);
- an autostereoscopic display; and
- a multiscopic display, namely, a multi-view autostereoscopic display, such as a lenticular array display, a parallax barrier display, or a directional backlight display.

The at least one optical element may comprise at least one of: a multiscopic optical element (such as a lenticular array or a parallax barrier), an optical combiner.

It will be appreciated that the system can be implemented as an AR system (such as an HUD in a vehicle or an HMD). In some implementations, the 3D display may be implemented as a transparent display. In other implementations, the 3D display may be implemented as a non-transparent display used in conjunction with an optical combiner. In such implementations, the optical combiner is arranged on an optical path of the non-transparent display and an optical path of a real-world light field of a real-world environment.

The term "light-emitting element" as used herein refers to any individually controllable emitter in the 3D display, including pixels, subpixels, or other display sampling units (e.g., emissive samples in a multisampling configuration). For avoidance of doubt, "light-emitting elements" encompasses the smallest addressable units of the 3D display, such as subpixels in RGB (or RGBW/RYYB or similar) architectures and full pixels in monochrome or colour-wheel architectures. In other words, subpixel-based sampling and adjustment are implicitly included within the scope of the present disclosure. In such implementations, the sample map may be generated with subpixel granularity that reflects such layouts, enabling outlines and font shape features to be adjusted relative to individual subpixel positions, thereby improving legibility and smoothness of text and vector graphics beyond the native pixel pitch of the 3D display.

The present disclosure also relates to the method as described above. Various embodiments and variants disclosed above, with respect to the aforementioned first aspect, apply mutatis mutandis to the method.

Optionally, adjusting the shape of the graphical element comprises snapping the graphical element to the perceived shapes and the perceived sizes of the light-emitting elements in the set by performing at least one of:

- adjusting a thickness of an outline of the graphical element, while maintaining the thickness within a predefined thickness range;
- shifting the outline of the graphical element, while maintaining a spacing between the graphical element and an adjacent graphical element within a predefined spacing range.

Snapping the graphical element within the predefined thickness range and/or the predefined spacing range ensures that outlines remain aligned with perceptually visible regions of the array while preserving typographic proportions. This improves legibility, prevents over-adjustment, and maintains consistent spacing between adjacent graphical elements under view-dependent distortion.

In some implementations, the graphical element is a font glyph, wherein adjusting the shape of the graphical element comprises snapping at least one font shape feature of the font glyph to a subset of the set of light-emitting elements by performing at least one of:

- increasing a size of the at least one font shape feature;
- adjusting a position of the at least one font shape feature.

Snapping font shape features such as stems, serifs, or diacritical marks to perceptually visible light-emitting elements ensures that critical details remain legible even under reduced effective resolution or distortion. This preserves typographic fidelity while adapting glyph features for stable and consistent perception in 3D displays.

Moreover, in some implementations, the graphical element is a font glyph, wherein selecting the set of light-emitting elements comprises including, in the set, light-emitting elements that align perceptually with at least one of: a top boundary of the font glyph, a bottom boundary of the font glyph, based on at least one font alignment feature. Including light-emitting elements that align with font alignment features such as the baseline, x-height, or cap height preserves structural consistency of glyphs under optical distortion. This maintains continuous alignment across glyphs in a line of text, ensuring readability and typographic stability in 3D displays.

Optionally, the method further comprises identifying one or more regions in the array in which light emitted by light-emitting elements is not perceptually visible to the given eye, based on the sample map, wherein adjusting the shape of the graphical element comprises performing at least one of:

- adjusting a thickness of an outline of the graphical element to avoid use of the one or more regions, while maintaining the thickness within a predefined thickness range;
- shifting the outline of the graphical element to avoid use of the one or more regions, while maintaining a spacing between the graphical element and an adjacent graphical element within a predefined spacing range.

By avoiding regions of the array that are not perceptually visible, the method prevents gaps, discontinuities, or missing features in glyphs and UI elements. Constraining outline thickness and spacing within predefined ranges ensures proportionality and legibility are preserved, maintaining stable and coherent rendering under dead zone conditions.

Furthermore, optionally, the method further comprises:

- determining whether at least one of: a size of the graphical element, a spacing between the graphical element and an adjacent graphical element, is permitted to vary within a predefined tolerance range; and
- when it is determined that the at least one of: the size, the spacing is permitted to vary, adjusting at least one of: the size, the spacing to snap the graphical element to the perceived shapes and the perceived sizes of the light-emitting elements in the set.

Allowing controlled variation of size or spacing within the predefined tolerance range gives flexibility to align glyphs or UI elements with perceptually visible regions. This avoids gaps or overlaps caused by non-uniform sampling while preserving typographic proportions and overall legibility.

Moreover, in some implementations, the method further comprises:

- determining another region of the array of light-emitting elements to be employed to display the graphical element to another eye of the individual one of the at least one user, based on the position of the graphical element within the 3D view frustum;

generating another sample map indicating perceived shapes, perceived sizes and relative perceived positions of light-emitting elements in at least the another region of the array, from a perspective of the another eye, based on a relative location of the another eye with respect to the image plane and on the optical distortion parameters of the at least one optical element; and selecting another set of light-emitting elements from the another region of the array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

By generating sample maps for both eyes and jointly selecting the respective sets of light-emitting elements, the method ensures binocular consistency of the graphical element. This joint adjustment avoids interocular mismatches such as ghosting or double contours, improving stereo clarity and preserving legibility of text and UI features across both viewpoints.

In other implementations, the 3D display further comprises another array of light-emitting elements and at least one another optical element arranged on an optical path of the another array of light-emitting elements, wherein the method further comprises:

determining another region of the another array of light-emitting elements to be employed to display the graphical element to another eye of the individual one of the at least one user, based on the position of the graphical element within the 3D view frustum;

generating another sample map indicating perceived shapes, perceived sizes and relative perceived positions of light-emitting elements in at least the another region of the another array, from a perspective of the another eye, based on a relative location of the another eye with respect to the image plane and on optical distortion parameters of the at least one another optical element; and selecting another set of light-emitting elements from the another region of the another array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

By generating sample maps for both arrays and jointly selecting the respective sets of light-emitting elements, the method maintains perceptual consistency of the graphical element across the two eyes. This prevents stereo artifacts such as misaligned edges or double contours, ensuring accurate depth cues and comfortable binocular viewing in stereoscopic displays.

Moreover, in some implementations, the graphical element is a font glyph in a line of text comprising a plurality of font glyphs, wherein the method further comprises:

selecting respective sets of light-emitting elements for displaying the plurality of font glyphs to the given eye; and selecting respective other sets of light-emitting elements for displaying the plurality of font glyphs to the another eye, wherein the plurality of font glyphs are displayed at a same optical depth.

By jointly selecting respective sets of light-emitting elements for both eyes, the method ensures that all font glyphs in a line of text are rendered consistently at the same stereo convergence depth. This preserves shared alignment features such as the baseline or cap height across both eyes, preventing discontinuities and maintaining clear, stable, and comfortably readable text.

Furthermore, optionally, the method further comprises:

capturing at least one real-world image of a real-world environment whose real-world light field is optically combined with a synthetic light field produced by the 3D display, using at least one real-world-facing camera; and determining, for each light-emitting element in the region of the array, at least one of: (i) a colour of a portion of the real-world light field corresponding to a direction in which light from said light-emitting element is directed toward the given eye, (ii) an intensity of the portion of the real-world light field, (iii) a distance between the given eye and a real-world object located along the direction, (iv) a motion vector indicating motion of the real-world object relative to the image plane, based on the at least one real-world image, wherein adjusting the shape of the graphical element comprises adjusting a thickness of an outline of the graphical element based on the at least one of: (i) the colour, (ii) the intensity, (iii) the distance, (iv) the motion vector.

By adapting outline thickness of graphical elements based on real-world image parameters such as brightness, depth, and motion, the method ensures that text and UI features remain visible and legible against dynamic backgrounds. This stabilizes the appearance of glyphs when synthetic content is combined with the real-world light field, improving readability and comfort in AR overlays and HUDs.

Moreover, optionally, the method further comprises:

determining a velocity at which the graphical element is moving across a sequence of frames;

determining whether the velocity exceeds a predefined velocity threshold; and when it is determined that the velocity exceeds the predefined velocity threshold, suppressing adjusting the shape of the graphical element based on the sample map.

Suppressing sample-map-based adjustment when the graphical element moves faster than the predefined velocity threshold prevents perceptual flicker and instability caused by rapid frame-to-frame corrections. This maintains temporal coherence and readability of fast-moving text or UI elements, reducing user fatigue and improving comfort in dynamic AR and HUD contexts.

Additionally, optionally, the method further comprises:

when it is determined that the velocity exceeds the predefined velocity threshold, determining respective emission intensities of adjacent light-emitting elements in the set based on a sub-element position of the graphical element for a given frame; and when employing the set of light-emitting elements to emit the light, emit light from the adjacent light-emitting elements with the respective emission intensities.

Assigning emission intensities to adjacent light-emitting elements based on the sub-element position of the graphical element simulates finer-than-pixel placement, even when shape adjustment is suppressed under high velocity. This weighted emission reduces perceptual “jumping,” smooths motion, and preserves the continuity and readability of fast-moving text or icons in AR and HUD displays.

More additionally, optionally, the method further comprises:

when it is determined that the velocity exceeds the predefined velocity threshold, determining a motion trajectory of the graphical element across the sequence of frames; and selecting the set of light-emitting elements for the given frame, based on the motion trajectory of the graphical element.

By determining the motion trajectory of the graphical element and selecting light-emitting elements accordingly, the method optimizes rendering continuity under rapid motion. This trajectory-aware selection reduces perceptual stuttering or ghosting and ensures smoother, more natural animation of text and graphics in dynamic AR or HUD contexts.

Moreover, optionally, the method further comprises determining at least one of: a direction of adjustment, a magnitude of adjustment applied to the shape of the graphical element in at least one previous frame, wherein adjusting the shape of the graphical element comprises employing at least one of: an adjustment direction, an adjustment magnitude that matches the at least one of: the direction, the magnitude of adjustment applied in the at least one previous frame. By matching adjustment direction or magnitude to those applied in previous frames, the method enforces temporal consistency of shape adjustments. This prevents jitter or flicker of glyph outlines and UI elements, ensuring perceptual stability and smoother rendering across successive frames.

DETAILED DESCRIPTION OF THE DRAWINGS

Figure 1B:
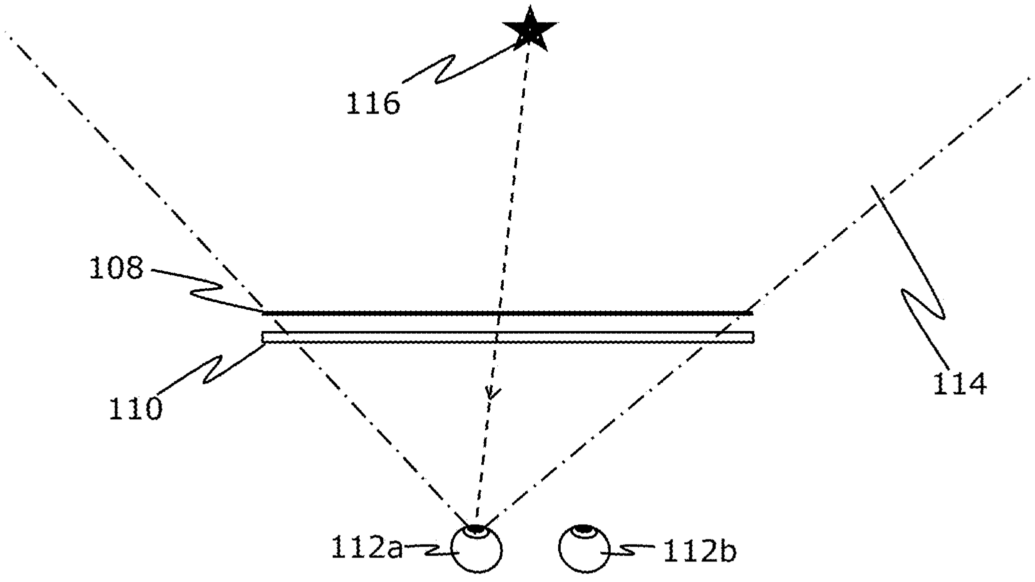

FIGS. 1A and 1B are schematic illustrations of a system 100 for graphical element hinting in a 3D display, in accordance with an embodiment of the present disclosure. The system 100 comprises a tracker 102, a 3D display 104, and at least one processor depicted as a processor 106. The 3D display 104 comprises an array 108 of light-emitting elements, and at least one optical element (depicted as an optical element 110) arranged on an optical path of the array 108 of light-emitting elements. In FIG. 1B, the optical element 110 has been shown as a multiscopic optical element (such as a lenticular array or a parallax barrier) for illustration purposes only.

The processor 106 is configured to:

determine a relative location of each eye 112*a*-112*b* of at least one user with respect to an image plane of the 3D display 104, using the tracker 102;

determine a 3D view frustum 114 corresponding to a given eye 112*a* of an individual one of the at least one user, based on a relative location of the given eye 112*a* with respect to the image plane;

determine a region of the array 108 of light-emitting elements to be employed to display a graphical element 116 to the given eye 112*a*, based on a position of the graphical element 116 within the 3D view frustum 114;

generate a sample map indicating perceived shapes, perceived sizes and relative perceived positions of light-emitting elements in at least the region of the array 108, from a perspective of the given eye 112*a*, based on the relative location of the given eye 112*a* with respect to the image plane and on optical distortion parameters of the at least one optical element;

adjust a shape of the graphical element 116, while selecting a set of light-emitting elements from the region of the array 108 for displaying the graphical element 116 to the given eye 112*a*, based on the sample map; and employ the set of light-emitting elements to emit light for displaying the graphical element 116 to the given eye 112*a*.

Figure 1D:
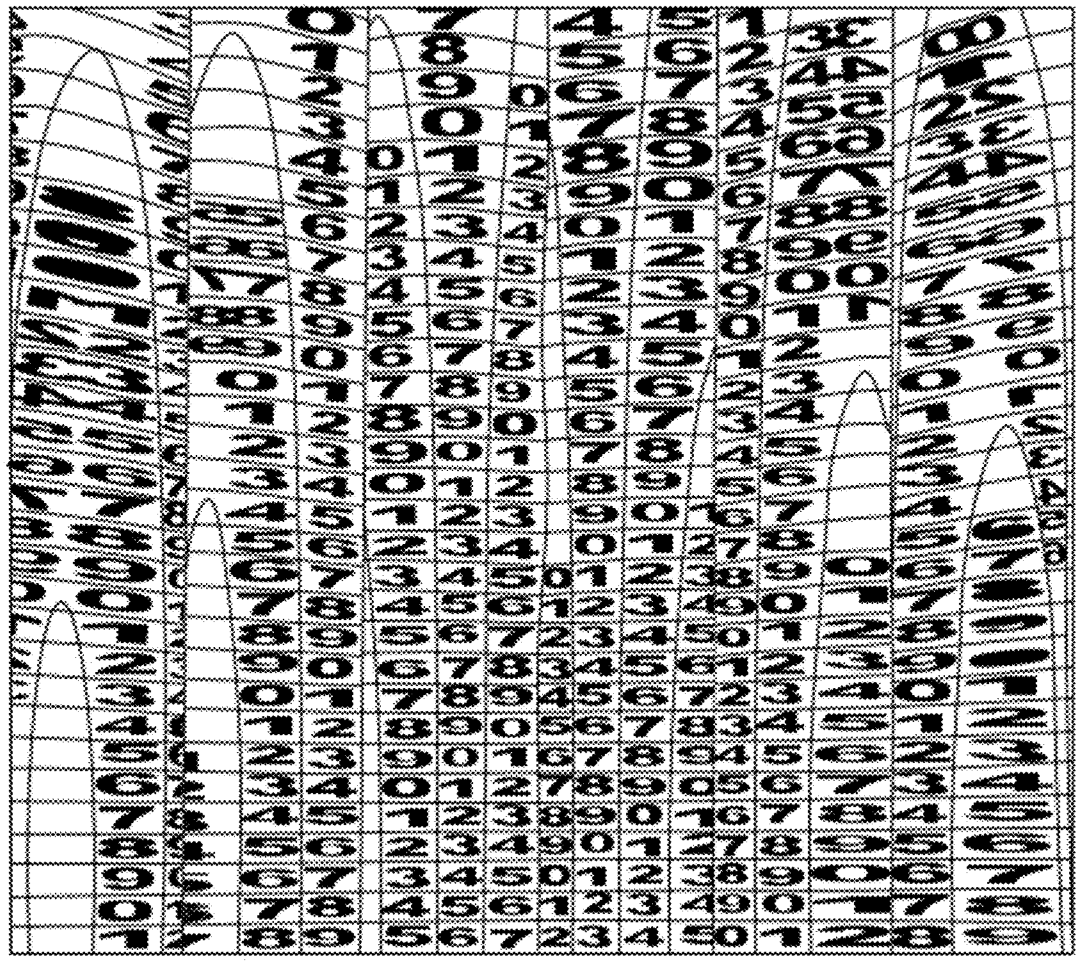
FIG. 1D is a schematic illustration of how light emanating from the light-emitting elements in the region is perceived by a given eye after passing through at least one optical element of the 3D display.

FIG. 1C is a schematic illustration of the aforesaid region of the array 108. The region is shown to have 10×10 light-emitting elements, for illustration purposes only; the region is not limited to any particular shape. Numbers have been assigned as identifiers to distinguish the light-emitting elements from other neighbouring light-emitting elements. FIG. 1D is a schematic illustration showing how light emanating from the light-emitting elements in the region of the array 108 is perceived by the given eye 112*a* after passing through the optical element 110, which is implemented as a lenticular array in the depicted example for illustration purposes only. With reference to FIG. 1D, perceived shapes, perceived sizes and relative perceived positions of the light-emitting elements in the region of the array 108 from the perspective of the given eye 112*a* are illustrated by distortions and mirroring in the identifiers (namely, numbers) assigned to the light-emitting elements. As shown, the distortion of the light-emitting elements in the region of the array 108 varies with the viewing direction of the given eye 112*a*. Moreover, certain light-emitting elements subtend a larger angular region in the user's field of view compared to other light-emitting elements. As an example, light-emitting elements located near left and right edges of a lenticular lens exhibit greater distortion. Such distortion depends on a focal length of the lenticular lens and a viewing distance between the given eye 112*a* and the light-emitting elements.

It may be understood by a person skilled in the art that FIGS. 1A and 1B include a simplified example implementation of the system 100, for sake of clarity, which should not unduly limit the scope of the claims herein. It is to be understood that a specific implementation of the system 100 is not to be construed as limiting it to specific numbers or types of trackers, 3D displays and processors. A person skilled in the art will recognize many variations, alternatives, and modifications of embodiments of the present disclosure. For example, the at least one optical element may include an optical combiner, wherein the array 108 of light-emitting elements is reflectively viewed via the optical combiner in some implementations.

Figure 2:
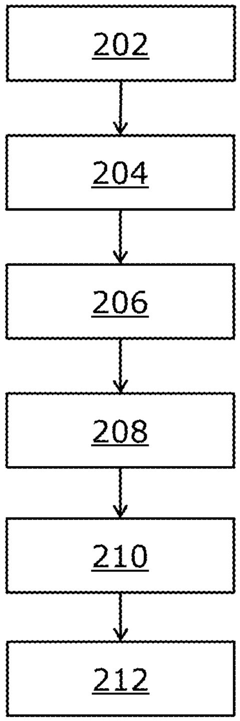
FIG. 2 illustrates steps of a method for graphical element hinting in a 3D display, in accordance with an embodiment of the present disclosure.

Referring to FIG. 2, illustrated are steps of a method for graphical element hinting in a 3D display, in accordance with an embodiment of the present disclosure. At step 202, a relative location of each eye of at least one user with respect to an image plane of the 3D display is determined, using a tracker. The 3D display comprises an array of light-emitting elements and at least one optical element arranged on an optical path of the array of light-emitting elements. At step 204, a 3D view frustum corresponding to a given eye of an individual one of the at least one user is determined, based on a relative location of the given eye with respect to the image plane. At step 206, a region of the array of light-emitting elements to be employed to display a graphical element to the given eye is determined, based on a position of the graphical element within the 3D view frustum. At step 208, a sample map indicating perceived shapes, perceived sizes and relative perceived positions of light-emitting elements in at least the region of the array, from a perspective of the given eye, is generated based on the relative location of the given eye with respect to the image plane and on optical distortion parameters of the at least one optical element. At step 210, a shape of the graphical element is adjusted, while selecting a set of light-emitting elements from the region of the array for displaying the graphical element to the given eye, based on the sample map. At step 212, the set of light-emitting elements is employed to emit light for displaying the graphical element to the given eye.

The aforementioned steps are only illustrative and other alternatives can also be provided where one or more steps are added, or one or more steps are provided in a different sequence without departing from the scope of the claims herein.

The invention claimed is:

1. A system comprising:

a tracker;

a three-dimensional (3D) display comprising:

an array of light-emitting elements; and at least one optical element arranged on an optical path of the array of light-emitting elements; and at least one processor configured to:

determine a relative location of each eye of at least one user with respect to an image plane of the 3D display, using the tracker;

determine a 3D view frustum corresponding to a given eye of an individual one of the at least one user, based on a relative location of the given eye with respect to the image plane;

determine a region of the array of light-emitting elements to be employed to display a graphical element to the given eye, based on a position of the graphical element within the 3D view frustum;

generate a sample map indicating perceived shapes, perceived sizes and relative perceived positions of light-emitting elements in at least the region of the array, from a perspective of the given eye, based on the relative location of the given eye with respect to the image plane and on optical distortion parameters of the at least one optical element;

adjust a shape of the graphical element, while selecting a set of light-emitting elements from the region of the array for displaying the graphical element to the given eye, based on the sample map; and employ the set of light-emitting elements to emit light for displaying the graphical element to the given eye.

2. The system of claim 1, wherein, when adjusting the shape of the graphical element, the at least one processor is configured to snap the graphical element to the perceived shapes and the perceived sizes of the light-emitting elements in the set by performing at least one of:

adjusting a thickness of an outline of the graphical element, while maintaining the thickness within a predefined thickness range;

shifting the outline of the graphical element, while maintaining a spacing between the graphical element and an adjacent graphical element within a predefined spacing range.

3. The system of claim 1, wherein the graphical element is a font glyph, and wherein, when adjusting the shape of the graphical element, the at least one processor is configured to snap at least one font shape feature of the font glyph to a subset of the set of light-emitting elements by performing at least one of:

increasing a size of the at least one font shape feature;

adjusting a position of the at least one font shape feature.

4. The system of claim 1, wherein the graphical element is a font glyph, and wherein, when selecting the set of light-emitting elements, the at least one processor is configured to include, in the set, light-emitting elements that align perceptually with at least one of: a top boundary of the font glyph, a bottom boundary of the font glyph, based on at least one font alignment feature.

5. The system of claim 1, wherein the at least one processor is configured to:

identify one or more regions in the array in which light emitted by light-emitting elements is not perceptually visible to the given eye, based on the sample map; and when adjusting the shape of the graphical element, perform at least one of:

adjusting a thickness of an outline of the graphical element to avoid use of the one or more regions, while maintaining the thickness within a predefined thickness range;

shifting the outline of the graphical element to avoid use of the one or more regions, while maintaining a spacing between the graphical element and an adjacent graphical element within a predefined spacing range.

6. The system of claim 1, wherein the at least one processor is configured to:

determine another region of the array of light-emitting elements to be employed to display the graphical element to another eye of the individual one of the at least one user, based on the position of the graphical element within the 3D view frustum;

generate another sample map indicating perceived shapes, perceived sizes and relative perceived positions of light-emitting elements in at least the another region of the array, from a perspective of the another eye, based on a relative location of the another eye with respect to the image plane and on the optical distortion parameters of the at least one optical element; and select another set of light-emitting elements from the another region of the array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

7. The system of claim 1, wherein the 3D display further comprises:

another array of light-emitting elements; and at least one another optical element arranged on an optical path of the another array of light-emitting elements, wherein the at least one processor is configured to:

determine another region of the another array of light-emitting elements to be employed to display the graphical element to another eye of the individual one of the at least one user, based on the position of the graphical element within the 3D view frustum;

generate another sample map indicating perceived shapes, perceived sizes and relative perceived positions of light-emitting elements in at least the another region of the another array, from a perspective of the another eye, based on a relative location of the another eye with respect to the image plane and on optical distortion parameters of the at least one another optical element; and select another set of light-emitting elements from the another region of the another array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

8. The system of claim 6, wherein the graphical element is a font glyph in a line of text comprising a plurality of font glyphs, and wherein the at least one processor is configured to:

select respective sets of light-emitting elements for displaying the plurality of font glyphs to the given eye; and select respective other sets of light-emitting elements for displaying the plurality of font glyphs to the another eye, wherein the plurality of font glyphs are displayed at a same optical depth.

9. The system of claim 1, further comprising at least one real-world-facing camera, wherein the at least one processor is configured to:

capture at least one real-world image of a real-world environment whose real-world light field is optically combined with a synthetic light field produced by the 3D display, using the at least one real-world-facing camera;

determine, for each light-emitting element in the region of the array, at least one of: (i) a colour of a portion of the real-world light field corresponding to a direction in which light from said light-emitting element is directed toward the given eye, (ii) an intensity of the portion of the real-world light field, (iii) a distance between the given eye and a real-world object located along the direction, (iv) a motion vector indicating motion of the real-world object relative to the image plane, based on the at least one real-world image; and when adjusting the shape of the graphical element, adjust a thickness of an outline of the graphical element based on the at least one of: (i) the colour, (ii) the intensity, (iii) the distance, (iv) the motion vector.

10. The system of claim 1, wherein the at least one processor is configured to:

determine a velocity at which the graphical element is moving across a sequence of frames;

determine whether the velocity exceeds a predefined velocity threshold; and when it is determined that the velocity exceeds the predefined velocity threshold, suppress adjusting the shape of the graphical element based on the sample map.

11. The system of claim 10, wherein the at least one processor is configured to:

when it is determined that the velocity exceeds the predefined velocity threshold, determine respective emission intensities of adjacent light-emitting elements in the set based on a sub-element position of the graphical element for a given frame; and when employing the set of light-emitting elements to emit the light, emit light from the adjacent light-emitting elements with the respective emission intensities.

12. The system of claim 10, wherein the at least one processor is configured to:

when it is determined that the velocity exceeds the predefined velocity threshold, determine a motion trajectory of the graphical element across the sequence of frames; and select the set of light-emitting elements for the given frame, based on the motion trajectory of the graphical element.

13. The system of claim 1, wherein the at least one processor is configured to:

determine at least one of: a direction of adjustment, a magnitude of adjustment applied to the shape of the graphical element in at least one previous frame; and when adjusting the shape of the graphical element, employ at least one of: an adjustment direction, an adjustment magnitude that matches the at least one of: the direction, the magnitude of adjustment applied in the at least one previous frame.

14. The system of claim 1, wherein the at least one processor is configured to:

determine whether at least one of: a size of the graphical element, a spacing between the graphical element and an adjacent graphical element, is permitted to vary within a predefined tolerance range; and when it is determined that the at least one of: the size, the spacing is permitted to vary, adjust at least one of: the size, the spacing to snap the graphical element to the perceived shapes and the perceived sizes of the light-emitting elements in the set.

15. A method comprising:

determining a relative location of each eye of at least one user with respect to an image plane of a three-dimensional (3D) display, using a tracker, wherein the 3D display comprises an array of light-emitting elements and at least one optical element arranged on an optical path of the array of light-emitting elements;

determining a 3D view frustum corresponding to a given eye of an individual one of the at least one user, based on a relative location of the given eye with respect to the image plane;

determining a region of the array of light-emitting elements to be employed to display a graphical element to the given eye, based on a position of the graphical element within the 3D view frustum;

generating a sample map indicating perceived shapes, perceived sizes and relative perceived positions of light-emitting elements in at least the region of the array, from a perspective of the given eye, based on the relative location of the given eye with respect to the image plane and on optical distortion parameters of the at least one optical element;

adjusting a shape of the graphical element, while selecting a set of light-emitting elements from the region of the array for displaying the graphical element to the given eye, based on the sample map; and employing the set of light-emitting elements to emit light for displaying the graphical element to the given eye.

16. The method of claim 15, wherein adjusting the shape of the graphical element comprises snapping the graphical element to the perceived shapes and the perceived sizes of the light-emitting elements in the set by performing at least one of:

adjusting a thickness of an outline of the graphical element, while maintaining the thickness within a predefined thickness range;

shifting the outline of the graphical element, while maintaining a spacing between the graphical element and an adjacent graphical element within a predefined spacing range.

17. The method of claim 15, wherein the graphical element is a font glyph, and wherein adjusting the shape of the graphical element comprises snapping at least one font shape feature of the font glyph to a subset of the set of light-emitting elements by performing at least one of:

increasing a size of the at least one font shape feature;

adjusting a position of the at least one font shape feature.

18. The method of claim 15, wherein the graphical element is a font glyph, and wherein selecting the set of light-emitting elements comprises including, in the set, light-emitting elements that align perceptually with at least one of: a top boundary of the font glyph, a bottom boundary of the font glyph, based on at least one font alignment feature.

19. The method of claim 15, further comprising:

determining another region of the array of light-emitting elements to be employed to display the graphical element to another eye of the individual one of the at least one user, based on the position of the graphical element within the 3D view frustum;

generating another sample map indicating perceived shapes, perceived sizes and relative perceived positions of light-emitting elements in at least the another region of the array, from a perspective of the another eye, based on a relative location of the another eye with respect to the image plane and on the optical distortion parameters of the at least one optical element; and selecting another set of light-emitting elements from the another region of the array for displaying the graphical element to the another eye, based on the another sample map, wherein the another set of light-emitting elements is selected jointly with the set of light-emitting elements, and the shape of the graphical element is adjusted to align with and snap to the perceived shapes and the perceived sizes of the light-emitting elements in both the set and the another set.

20. The method of claim 19, wherein the graphical element is a font glyph in a line of text comprising a plurality of font glyphs, and wherein the method further comprises:

selecting respective sets of light-emitting elements for displaying the plurality of font glyphs to the given eye; and selecting respective other sets of light-emitting elements for displaying the plurality of font glyphs to the another eye, wherein the plurality of font glyphs are displayed at a same optical depth.

* * * * *